No. 760,900. PATENTED MAY 24, 1904.
F. MILLER.
VARIABLE SPEED TRANSMITTER.
APPLICATION FILED JULY 31, 1903.
NO MODEL. 2 SHEETS—SHEET 2.
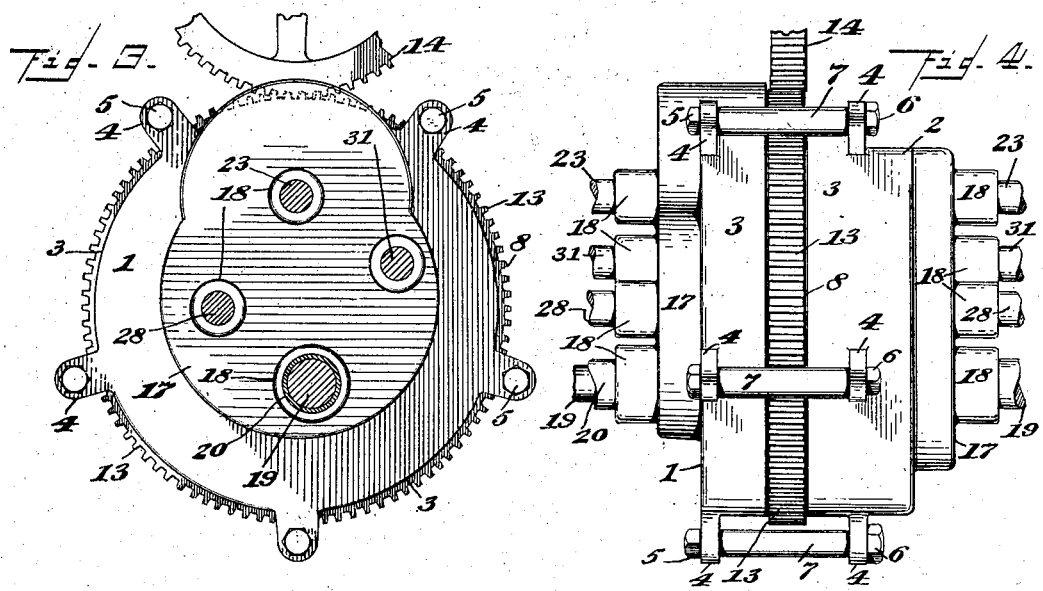
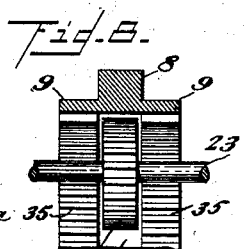
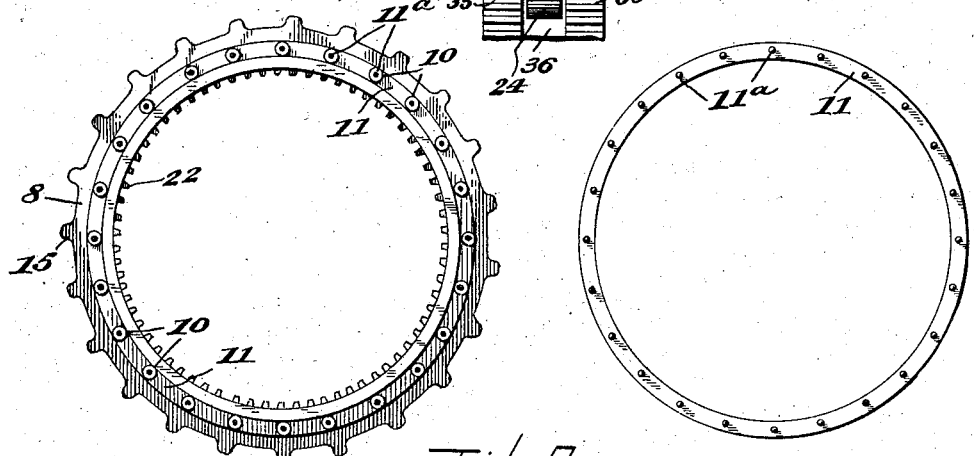
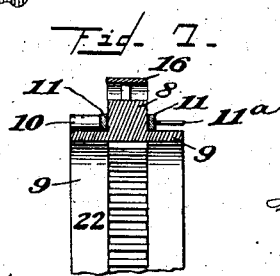

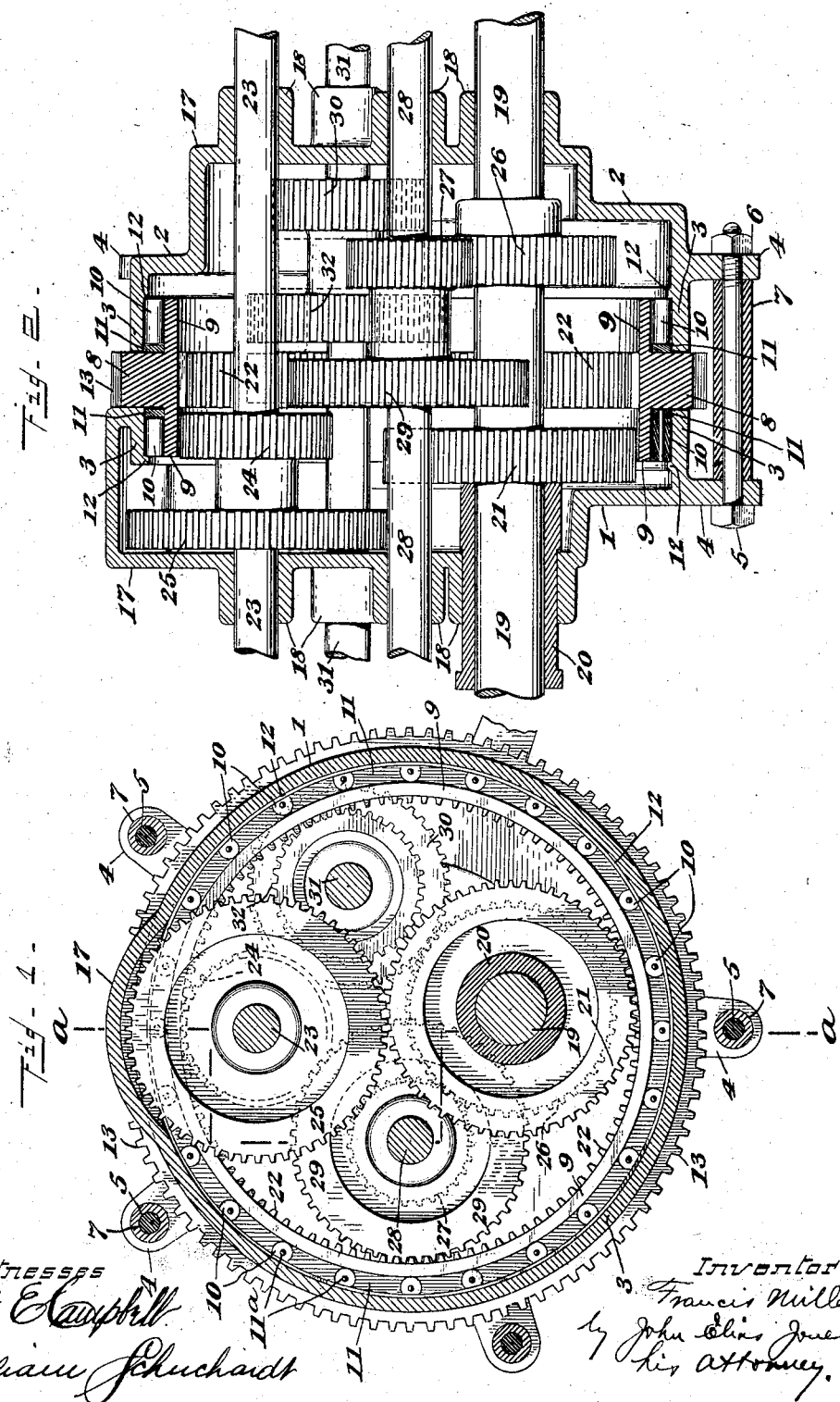

No. 760,900. Patented May 24, 1904.

UNITED STATES PATENT OFFICE.

FRANCIS MILLER, OF BELLEVUE, KENTUCKY.

VARIABLE-SPEED TRANSMITTER.

SPECIFICATION forming part of Letters Patent No. 760,900, dated May 24, 1904.

Application filed July 31, 1903. Serial No. 167,755. (No model.)

*To all whom it may concern:*

Be it known that I, FRANCIS MILLER, a citizen of the United States of America, and a resident of Bellevue, in the county of Campbell and State of Kentucky, have invented certain new and useful Improvements in Variable-Speed Transmitters, of which the following is a specification.

This invention relates to certain improvements in transmitting devices, and more particularly in that class of such devices which are adapted for adjustment for securing a multiplicity of speed variations; and the object of the invention is to provide a device of this character of a simple and inexpensive nature and of a compact, strong, and durable construction, wherein is eliminated as far as possible the element of loss due to wear and friction of the parts.

The invention consists in certain novel features of the construction, combination, and arrangement of the several parts of the improved variable-speed transmitting device, whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a sectional elevation taken through the casing or housing of the transmitting device in a plane at right angles to the axis of rotation and showing the several parts contained in the casing or housing. Fig. 2 is a sectional view taken through the casing or housing in a broken plane at right angles to the plane of the section in Fig. 1, as indicated by the line $a\,a$ in Fig. 1. Fig. 3 is a side view of the improved transmitting device drawn to a reduced scale. Fig. 4 is an edge elevation of the transmitting device. Fig. 5 is a side elevation showing the main annular member or master-ring of the device detached. In this view the master-ring is shown provided with a sprocket-face. Fig. 6 is a view showing detached one of the annular parts or rings whereon are held the antifriction-rollers for supporting the main member or master-ring. Fig. 7 is a partial section taken through an edge portion of the main member or master-ring and showing the same provided with a belt-face over which a belt or band is to be passed. Fig. 8 is a fragmentary detail view showing in section an edge portion of the master-ring for illustrating a modified form thereof.

The improved transmitting device comprises a casing or housing formed of two parts or sections 1 and 2, hollowed on adjacent sides, so as to produce therein a hollow or chamber, wherein are contained the operative parts of the device. The housing or casing is of a general circular or rounded form, as indicated in Figs. 1 and 3, each part or section 1 and 2 being formed with an inturned circular flange 3, which flanges are alined and form the peripheral surface of the circular casing or housing. The parts or sections 1 and 2 of the casing have projecting integral lugs 4 4, correspondingly arranged and perforated for the passage of bolts 5, extending each through a lug of each part or section to tie the sections together, spacing-sleeves 7 being held on the bolts between the lugs 4 and nuts 6 being screwed on the bolts to hold them in position. By means of the spacing-sleeves 7 the circular inturned flanges 3 3 of the respective parts or sections 1 and 2 are held apart from each other, so as to produce an annular space between the sections and extended around the perimeter of the casing or housing, and in said annular space is held to turn a main annular transmitting member or master-ring 8, the peripheral portion of which is extended outside the casing or housing and the inner part of which is extended inside the casing or housing and has laterally-extended annular flanges 9 9 projecting from its opposite sides and concentric with but spaced slightly apart from the inner surfaces of the flanges 3 3 of sections 1 and 2.

10 10 indicate antifriction-rollers arranged in two series, one at each side of the main member or master-ring, and interposed between the respective flanges 3 and 9 in such a way as to hold the master-ring 8 for free turning movement within the casing or housing with a minimum of friction and wear. The rollers 10, as seen in the drawings, are held on pins 11ª extended from rings 11, one at each side of the master-ring, and the said rollers are held from lateral displacement by means of internal beads or flanges 12 produced within the sections or parts 1 and 2 of the casing and engaged with the outer ends of the rollers of the respective series.

The projecting peripheral portion of the main transmitting member or master-ring 8 is adapted for operative engagement with any desired mechanism which may thus be operatively connected to drive or be driven from the master-ring. In Figs. 1 to 4 the member or master-ring 8 is shown as provided with a toothed gear-surface 13, adapted for driving engagement with a toothed wheel 14, as seen in Figs. 3 and 4; but I do not desire to limit myself to the employment of a toothed driving-surface on the master-ring, since other forms of gearing may be substituted for the toothed gearing. For example, in Fig. 5 I have shown the master-ring provided with a sprocket-face 15 to be engaged by a chain belt, and in Fig. 7 I have shown said master-ring provided with a belt-face 16, over which a belt or band may be passed in a well-known way.

The parts or sections 1 and 2 of the housing are formed with integral outwardly-projecting portions 17 17, forming enlargements of the interior chamber of the housing, and these enlargements are adapted to receive various parts of the internal operative mechanism of the transmitting device when moved out of operative position, and said projecting portions 17 are formed with bearings 18 18 suitably arranged for receiving various shafts, one of which (the shaft 19) is adapted for connection outside of the housing with any desired mechanism which may drive or be driven from said shaft 19.

20 indicates a sleeve mounted for endwise movement at one side of the housing upon shaft 19 and extended through the corresponding bearing 18 into the interior chamber of the housing, wherein is a toothed gear-wheel 21, connected with the sleeve and also adapted for movement in the direction of the length of the shaft, the sleeve affording a means for moving said wheel 21 and the teeth of the wheel when the same is moved to a position central within the master-ring being adapted for driving engagement with the teeth of an annular internal gear-surface 22 produced centrally within the master-ring. By this arrangement it will be seen that when the sleeve 20 is actuated to move the wheel 21 over to the right from the position shown in Fig. 2 the teeth of said wheel will engage the central gear-face 22 of the master-ring, whereby shaft 19 will drive or be driven from the master-ring at a relatively slow speed, and when the sleeve 20 is reversely moved, so as to position wheel 21, as seen in Fig. 2, the gear-surfaces will be disengaged and either shaft 19 or master-ring 8 may turn freely and independently.

23 indicates another shaft, journaled in bearings 18 18 above shaft 19, said shaft 23 being adapted for endwise movement in the housing within the master-ring 8, as indicated in Figs. 1 and 2, and on said shaft 23 is carried a toothed pinion 24, the teeth of which when the shaft is moved over toward the right from the position shown in Fig. 2 are adapted for engagement with the teeth of the internal gear-face 22 of the master-ring, and said pinion 24 is connected by an integral hub or sleeve with another toothed gear-wheel 25 of larger diameter, which when the shaft is moved to engage pinion 24 with gear-face 22 will be moved into engagement with the gear-wheel 21 on shaft 19, whereby the shaft 19 will drive or be driven from the master-ring through the medium of the intermediate gears 24 and 25, the direction of movement in this position of the parts being, however, the reverse to that secured when the gear-wheel 21 is directly engaged with the teeth of gear-face 22. When the shaft 23 is reversely moved to position the gear-wheels 24 and 25, as seen in Fig. 2, the pinion 24 will be out of mesh with gear-face 22 and no movement will be imparted thereto. In this position of the parts the gear-wheel 25 is also out of mesh with wheel 21 on shaft 19.

Upon the shaft 19 is secured at the side of the housing opposite the gear-wheel 21 another gear-wheel 26 of less diameter than said wheel 21, and 27 indicates a pinion held upon a shaft 28, extended through the housing inside the master-ring and movable endwise in bearings 18 18, said pinion 27 having an integral hub or sleeve whereby it is connected with a gear-wheel 29, the teeth of which when the shaft 28 is moved to the position shown in Fig. 2 being in engagement with the gear-face 22 of the master-ring 8 in such a way that the shaft 19 will drive or be driven from the master-ring through the medium of said gear-wheels 26, 27, and 29. When shaft 28 is moved over toward the left from the position seen in Fig. 2, the pinion 27 will be disengaged from wheel 26, and at the same time the wheel 29 will be disengaged from the gear-face of the master-ring, so that there will be no movement of wheels 27 and 29.

31 indicates another shaft extended lengthwise through the housing within the master-ring and adapted also for endwise movement in bearings 18, and on said shaft is a pinion 30, the teeth of which when shaft 31 is moved toward the left from the position shown in Fig. 2 are adapted to mesh with the teeth of wheel 26 on shaft 19. The pinion 30 has an integral hub or sleeve connecting it with another gear-wheel 32, which when the shaft 31 is moved to engage wheel 30 with wheel 26 will be engaged with the internal gear-face 22 of the master-ring in such a way that shaft 19 will drive or be driven from the master-ring through the medium of the wheels 32, 30, and 26. When the shaft 31 is reversely moved to position wheels 30 and 32, as shown in Fig. 2, the wheel 30 will be disengaged from wheel 26, and at the same time the wheel 32 will be disengaged from the gear-face 22 of the master-ring, so that in this position of the parts no movement will be imparted to said wheels 32 and 30.

In the use of the improved transmitting device power from a suitable source may be applied in any desired way to rotate shaft 19 or to turn the master-ring, since either of these parts may be the initial elements of the transmitting device. When the device is employed in automobiles and the like, for which it has special advantages, the shaft 19 may very conveniently be the driving-axle, and the master-ring 8 may be geared with the engine by spur-gearing or by a sprocket-chain or any other desirable means.

Suitable means will be provided for moving the shafts 23, 28, and 31 and the collar or sleeve 19 for the adjustment of the internal parts in their various positions, and when the master-ring is the initial element for transmission and shaft 23 is actuated to engage its pinion 24 with the gear-face 22 of the master-ring its gear-wheel 25 will be engaged with the gear-wheel 21 on shaft 19, so that said shaft 19 will be driven from the master-ring at an increased speed. In a similar way when the shaft 28 is actuated to engage its pinion 27 with the wheel 26 on shaft 19 its wheel 29 will be engaged with the gear-face 22 of the master-ring in such a way as to drive the shaft 19 from the master-ring at a speed less than that attained through the medium of the gears 24, 25, and 21, and when shaft 31 is actuated to engage its gear 30 with the gear-wheel 26 on shaft 19 its gear-wheel 32 will be engaged with the gear-face 22 of the master-ring in such a way as to afford a third speed variation. When the sleeve 20 is moved to engage the wheel 21 of shaft 19 with the gear-face 22 of the master-ring, the direction of movement of said shaft 19 will be reversed, as will be understood.

It will be seen from the above description that the improved transmitting device is of an extremely simple, strong, and compact structure and is therefore especially well adapted for use and also that, since but one series of the intermediate gears is in service at a time, the wear of the parts and loss of power due to friction are reduced to a minimum. The change of speed may also be quickly secured, and the direction of movement may be quickly reversed when desired. It will also be obvious from the above description that the device is susceptible of some modification without material departure from the principles and spirit of the invention, and for this reason I do not desire to be understood as limiting myself to the precise form and arrangement of the several parts of the device herein set forth in carrying out my invention in practice. For example, a greater or less number of the shafts, such as are shown at 23, 28, and 31, and whereon are carried the intermediate gears, may be employed without departure from the invention, and, if desired, the master-ring may have more than one internal gear-face, as indicated in Fig. 8. In this view the master-ring has two internal gear-faces 35 35, which are separated by a space 36, wherein the pinion 24 on shaft 23 stands idle when the shaft is moved to throw its gears out of operation. Instead of the internal face of the master-ring being toothed and the several internal wheels being gear-wheels, said internal face and said gear-wheels could be constructed either plain or bevel-faced and engage each other on the same plan as hereinbefore described for said master-ring and internal gear-wheels; but I prefer the use of the internally-toothed master-ring and the gear-wheels, such as are shown in the drawings, as the operation thereof is more positive and effective. It will also be obvious that the improved transmitting device constructed according to my invention is especially well adapted for use in automobiles and the like, but is also well adapted for use in all other situations where changeable gearing is required, and for this reason I do not desire to limit myself to the employment of the improved device in connection with any particular class of machinery.

What I claim is—

1. A transmitting device comprising an internally-toothed master-ring, a shaft having a gear-wheel movable into and out of engagement with the internal gear-face of the master-ring and a plurality of intermediate gears movable in the direction of the length of said shaft and each engageable with the internal teeth of the master-ring and also with the gear-wheel on the shaft.

2. A transmitting device comprising an internally-toothed master-ring, a transmitting-shaft having a gear-wheel laterally movable into and out of any engagement with the master-ring, a plurality of shafts extended through the master-ring and arranged for endwise movement and gears on said shafts and engageable, in the endwise movement thereof, with the internal teeth of the master-ring and also with the gear-wheel of the transmitting-shaft.

3. A transmitting device comprising an internally-toothed master-ring having flanges at opposite sides, annular supporting means at the sides of the master-ring and concentric with the flanges of the master-ring, rollers interposed between the flanges of the master-ring and said annular supporting means, a transmitting-shaft having a gear and intermediate gears movable in the direction of the length of the transmitting-shaft and engageable with the internal teeth of the master-ring and with the gear-wheel on the transmitting-shaft.

4. A transmitting device comprising an internally-toothed master-ring having flanges at opposite sides, a housing having annular parts at opposite sides of the master-ring and concentric with the flanges thereof, rollers interposed between the flanges of the master-ring and the annular parts of the housing, a transmitting-shaft having a gear and intermediate gears movable in the direction of the length of the transmitting-shaft and engageable with the internal teeth of the master-ring and with the gear-wheel of the transmitting-shaft.

5. A transmitting device comprising a housing formed in two parts having similar inturned opposite flanges and provided with means for holding them in relation with said flanges spaced apart, a master-ring held between the flanges of the housing with a driving-surface presented at the perimeter thereof and with supporting means inside the housing, and provided with an internal gear-face and gearing inclosed in the housing and engageable with the internal gear-face of the master-ring.

6. A transmitting device comprising an internally-toothed master-ring, a transmitting-shaft, a gear-wheel on said shaft movable in and out of engagement with the internal face of the master-ring, a second gear-wheel fixed on said transmitting-shaft, a longitudinally-movable supplementary shaft carrying two gear-wheels one of which is adapted to engage with the fixed gear-wheel on the transmitting-shaft while the other is engaged with the master-ring.

7. A transmitting device comprising an internally-toothed rotary master-ring, a main transmitting-shaft carrying two gear-wheels of different size, one of which is movable and adapted to engage the master-ring, and supplemental shafts each carrying two gear-wheels one wheel of each supplementary shaft being adapted to engage the master-ring while the other engages one of the two wheels on the main transmitting-shaft.

Signed at Cincinnati, Ohio, this 27th day of July, 1903.

FRANCIS MILLER.

Witnesses:
JOHN ELIAS JONES,
WILLIAM E. CAMPBELL.